US 6,638,660 B2

(12) United States Patent
Stone et al.

(10) Patent No.: US 6,638,660 B2
(45) Date of Patent: Oct. 28, 2003

(54) SEISMIC RATED BATTERY RACKING SYSTEM

(75) Inventors: Bradley W. Stone, Yorkville, IL (US); Robert E. Linning, Jr., Crystal Lake, IL (US)

(73) Assignee: Exide Technologies, Alpharetta, GA (US)

( * ) Notice: Subject to any disclaimer, the term of this patent is extended or adjusted under 35 U.S.C. 154(b) by 0 days.

(21) Appl. No.: 09/963,722

(22) Filed: Sep. 26, 2001

(65) Prior Publication Data

US 2002/0086202 A1 Jul. 4, 2002

Related U.S. Application Data

(60) Provisional application No. 60/235,742, filed on Sep. 27, 2000.

(51) Int. Cl.[7] .............................................. H01M 2/10
(52) U.S. Cl. ........................ 429/99; 429/100; 211/153
(58) Field of Search ........................... 429/96, 99, 100; 211/134, 153; 108/59

(56) References Cited

U.S. PATENT DOCUMENTS 4,826,265 A * 5/1989 Hockenberry ............... 312/326
5,890,606 A * 4/1999 Kuipers ..................... 211/186
6,234,088 B1 * 5/2001 Bredal et al. ................ 108/91

FOREIGN PATENT DOCUMENTS

WO     WO 00/30190    * 5/2000

* cited by examiner

Primary Examiner—Randy Gulakowski
Assistant Examiner—Jonathan Crepeau
(74) Attorney, Agent, or Firm—Morrison & Foerster LLP

(57) ABSTRACT

A battery rack system for stationary power applications is provided. The rack systems includes a rack assembly configured so as to be seismically rated for UBC Zone IV requirements. The rack assembly has a plurality of shelves which are supported by a rack frame such that each shelf along with the rack frame defines a respective cell-receiving area having a front opening. Each shelf has at least one associated cell restraint that is removably connected to the rack assembly. The restraint spans across the front opening to the respective cell-receiving area so as to restrain movement of a cell arranged therein. The system includes at least one channel disposed within the footprint of the rack frame which extends so as to provide a passage between adjacent cell-receiving areas for accommodating wires used to couple cells stored in the rack system together.

10 Claims, 4 Drawing Sheets

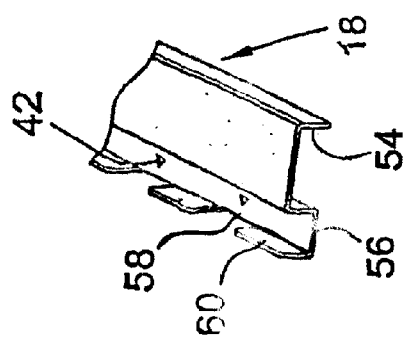
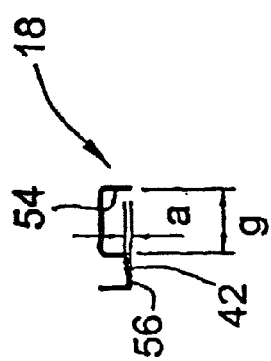
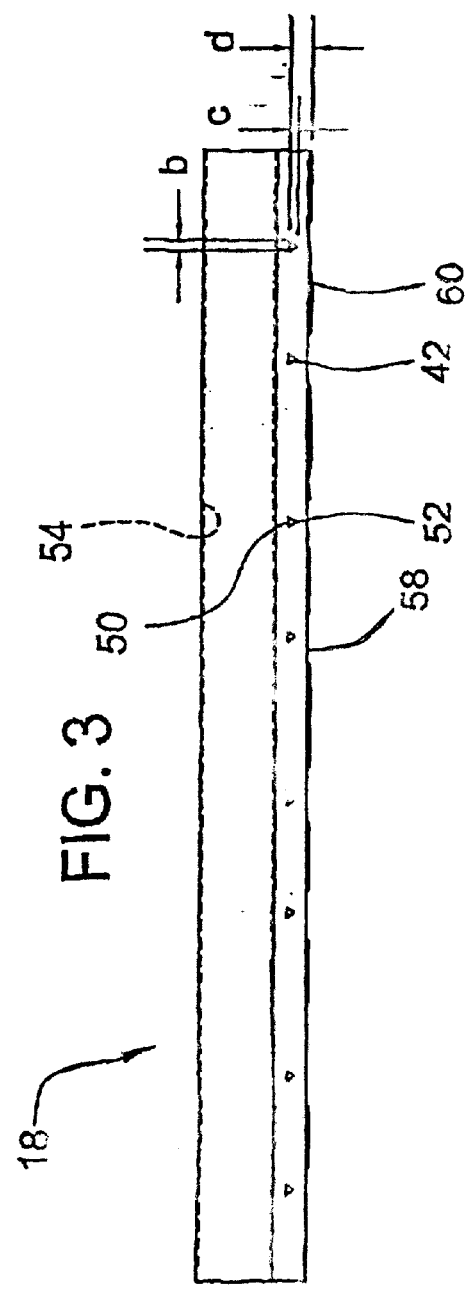
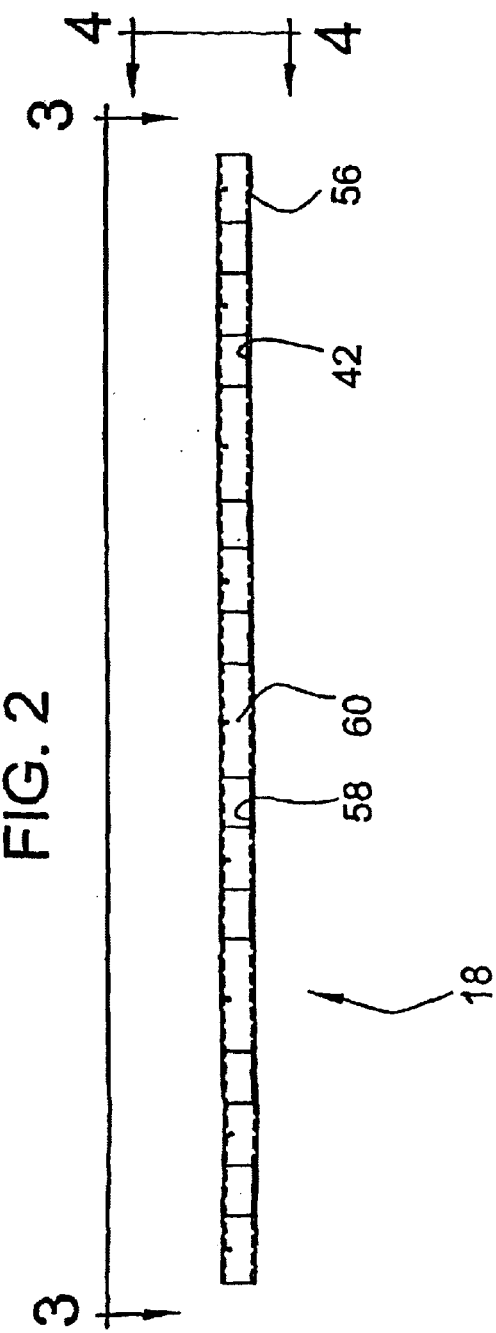

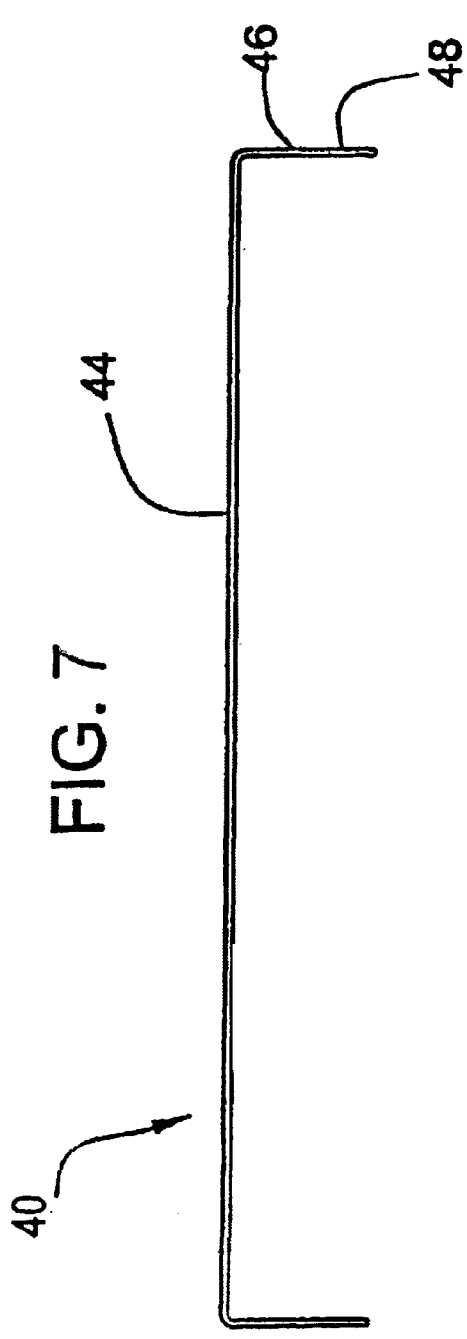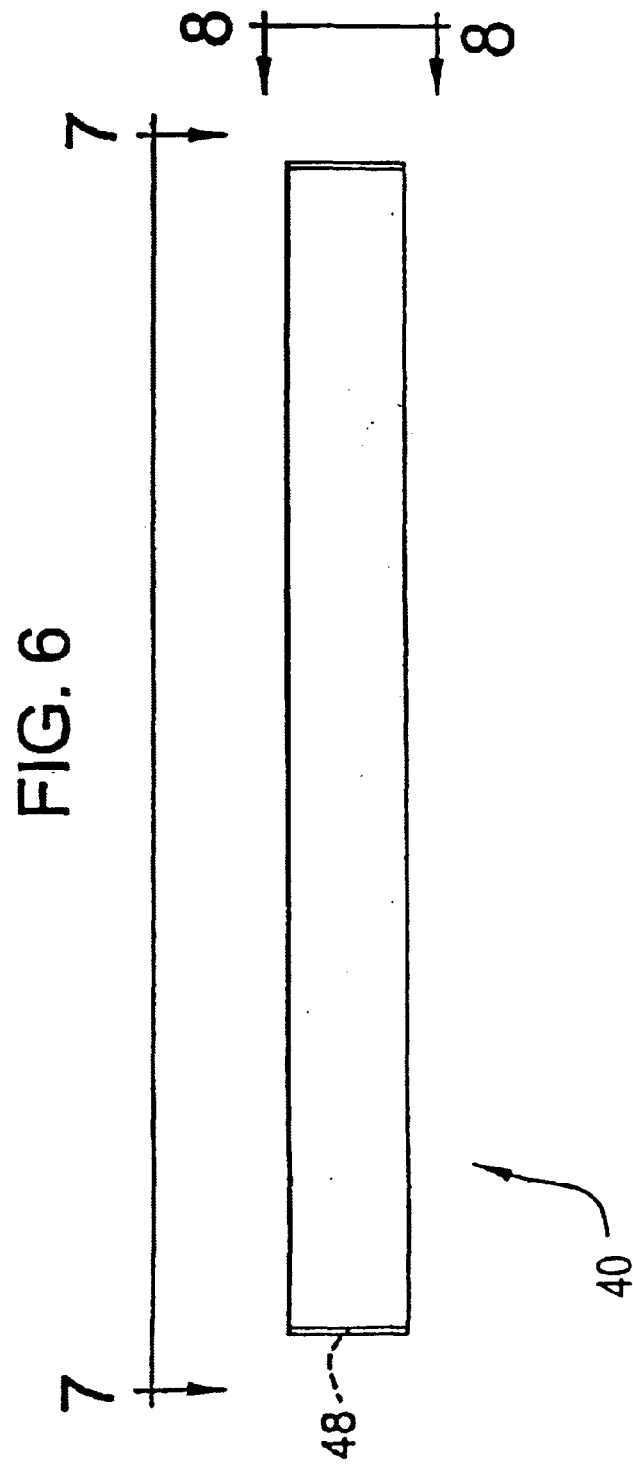

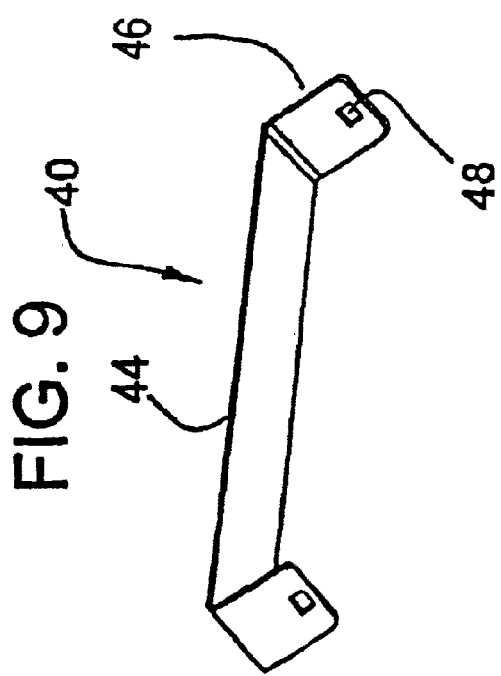
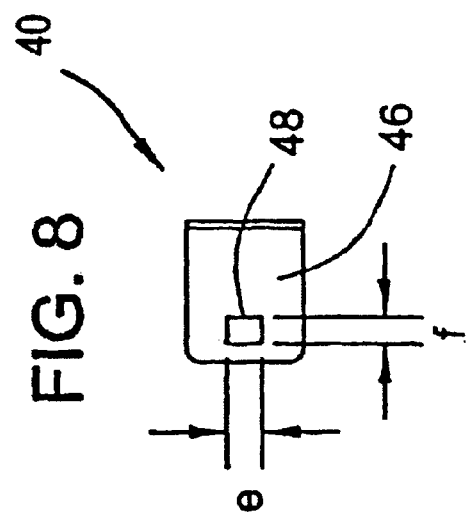

SEISMIC RATED BATTERY RACKING SYSTEM

CROSS REFERENCE TO RELATED APPLICATION

This application claims the benefit of U.S. Provisional Application No. 60/235,742 filed Sep. 27, 2000, the disclosure of which is incorporated herein by reference.

FIELD OF THE INVENTION

This invention relates to lead-acid cells and to sealed lead-acid cells, and, more particularly, to a seismic rated racking system for housing such cells.

DESCRIPTION OF THE PRIOR ART

Stationary batteries are specifically designed for float applications, that is, as standby power in the event of a power failure. Stationary batteries are usually maintained at a full-state-of-charge and in a ready-to-use condition typically by floating at a constant preset voltage. Standby batteries are used for standby or operational power in the communications field, utilities, for emergency lighting in commercial buildings and uninterruptible power supplies.

Uninterruptible power supplies are systems that back-up computers and communication networks. Sealed lead-acid cells and/or batteries may comprise the power source. The uninterruptible power source allows for the orderly shut down of computers when there is a sudden interruption in the primary electrical source, such as during a power outage and provides back-up power for communications networks. The uninterruptible power supply also will accommodate short, or intermittent, losses in power. When there is a power interruption, the batteries in the uninterruptible power system can be subject to rapid discharge.

The sealed lead-acid stationary cells and/or batteries used for industrial applications where the power requirements are high and quite demanding are typically comprised of from several to a large number of individual sealed lead-acid cells connected to one another to form a battery with the desired capacity and power requirements. The individual sealed lead-acid cells may be connected in series, in parallel or in suitable combinations of series and parallel to form a battery with the desired capacity and power requirements. External connections are typically made between the negative and positive terminal posts of the respective cells.

Because of space considerations, these large capacity cells need to be placed on racks, cabinets or the like in an attempt to minimize the space requirements. A complicating factor in designing suitable cabinets and cell tray assemblies is that, for Universal Building Code Zone IV applications, i.e., locations where high seismic conditions can occur, there are stringent requirements that must be met to ensure that the cells are adequately secured in the racks should such high seismic conditions occur. Indeed, from a manufacturing and inventory control standpoint, a cell tray assembly is desirable which can be used in all applications, rather than requiring a design unique for Zone 4 applications.

The wiring in previous seismically rated racking systems typically extends out beyond the envelope of the rack. Thus, additional space beyond the footprint of the rack is required to allow for wiring. Additionally, previous systems can be difficult to assemble in that they comprise a large number of loose parts which must be assembled together leading to increased assembly and handling costs.

In addition to the above considerations, it is necessary to provide a cost-effective cell tray assembly that satisfies the varying, and demanding, criteria as discussed herein while overcoming the disadvantages likewise discussed herein. None of the cell racks and assemblies currently available satisfies such objectives.

It is accordingly a principal object of the present invention to provide a cost effective battery racking system which is easy to assemble and is seismically rated to satisfy UBC Zone IV requirements.

Another object of the invention is to provide a battery racking system that is entirely contained within the rack footprint, not requiring additional footprint space merely for the attachment of external couplers or wiring.

A further object is to provide a cell tray assembly for housing cells used for stand-by applications in which each cell is retained in the assembly, yet is readily accessible from the front of the assembly.

Yet another object of the present invention provides a battery racking system which is inexpensive, may be readily manufactured, and is easy to utilize in the field.

These and other objects and advantages of the present invention will be apparent upon the following description and drawings. It should be appreciated that the intention is not to limit the present invention to the disclosed embodiments, but, rather, the intention is to cover all embodiments within the scope of the present invention as disclosed and claimed hereinafter. While the present invention has been described primarily in conjunction with an open rack, the present invention is equally applicable to other types of cabinets or the like.

SUMMARY OF THE INVENTION

The invention provides a racking system which includes a frame supporting shelves on which battery cells are disposed. Channels extending along the outsides of the shelves allow the placement of wires within the footprint of the racking system. Restraints for maintaining the cells in position during seismic activity are coupled to the frame.

BRIEF DESCRIPTION OF THE DRAWINGS

FIG. 2 is a front elevational view of the rack support of the system illustrated in FIG. 1;

FIG. 3 is a side elevational view of the rack support taken along Line III—III in FIG. 2;

FIG. 4 is a top plan view of the rack support taken along Line IV—IV in FIG. 2;

FIG. 5 is a fragmentary perspective view of the rack support of FIGS. 2–4;

FIG. 6 is a rear elevational view of the strap restraint of the system illustrated in FIG. 1;

FIG. 7 is a top plan view of the strap restraint of FIG. 6 taken along Line VII—VII in FIG. 6;

FIG. 8 is an end view of the strap restraint taken along Line VIII—VIII in FIG. 6; and FIG. 9 is a reduced size perspective view of the strap restraint of FIGS. 6–8.

DETAILED DESCRIPTION OF THE INVENTION

Figure 1:
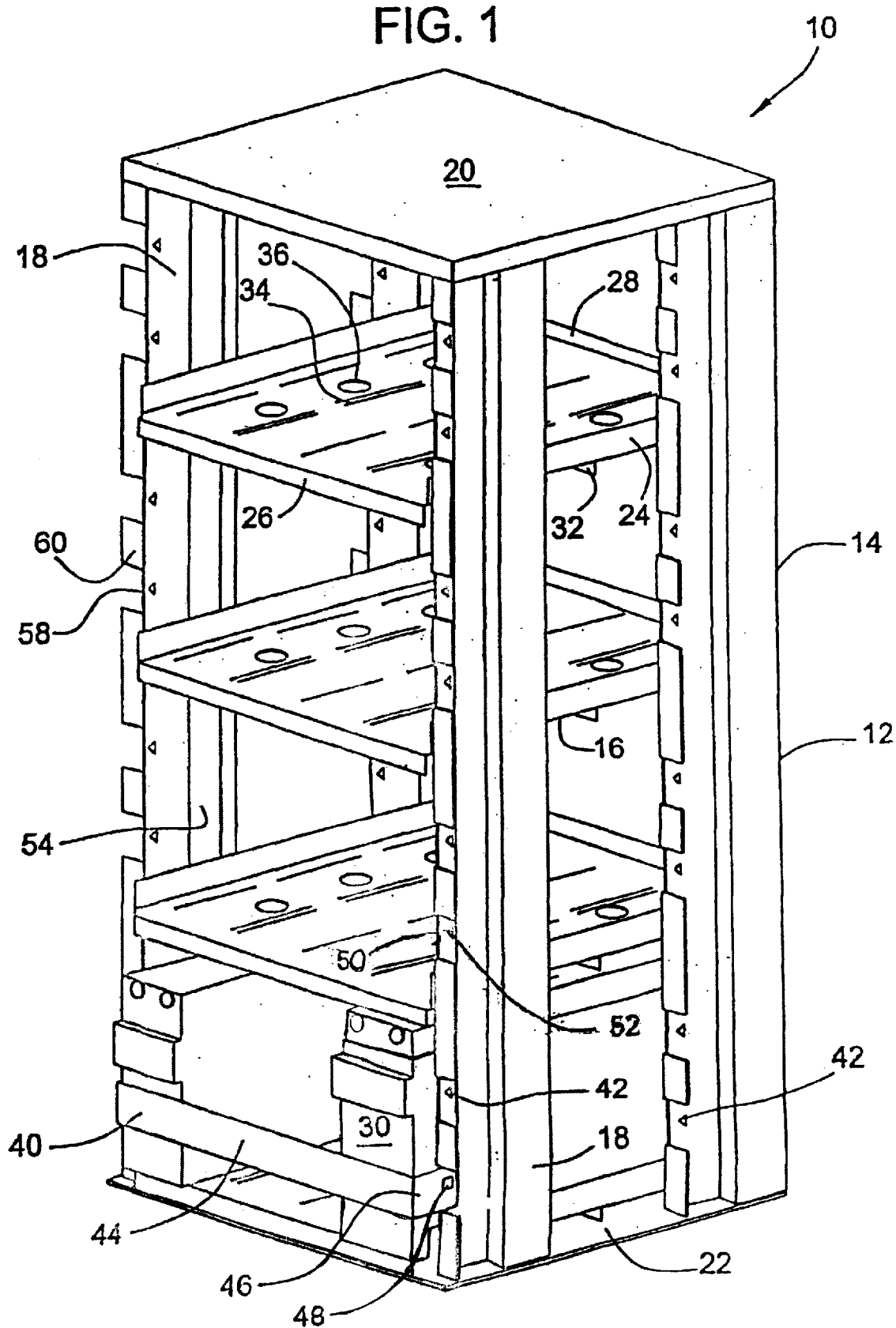
FIG. 1 is a perspective view of a battery racking system constructed in accordance with teachings of the invention.

Turning now to the drawings, there is shown in FIG. 1 a racking system 10 constructed in accordance with teachings of the invention. The racking system includes a rack assembly 12 which includes a frame 14 and a plurality of shelves 16. In this case, the frame includes four upright or vertical rack supports 18 disposed at the corners of the frame 14, a cover or roof 20 and base 22, both affixed to the portable rack supports 18. The base 22 may be mounted to the floor by any appropriate method.

In the illustrated embodiment, the shelves 16 are formed of steel sheets which are bent upward along edges 24 for attachment to the vertical rack supports 18. The shelf side edge flange 24 and the roof 20 are secured to the vertical rack supports 18 by any appropriate means, such as welding. To provide added strength, the shelves 16 further include flanges 26, 28 along the front and rear edges of the shelves, respectively, to provide easy access and placement of the battery cells 30, the front flange 26 is bent downward, while the rear flange 28 is bent upward to assist in maintaining the cell 30 in position on the shelf 16. The shelf may further include a flange 32 extending laterally below the shelf. The flange may be coupled to the shelf 16 by any appropriate means, such as welding. The shelf may further include bent channels 34 to further enhance strength and provide enhanced air circulation around the cells 30. Openings 36 in the shelf 16 further provide increased air circulation.

It will be appreciated, however, alternative shelf and roof designs may be used, such as welded boxes. The frame is typically made of steel, preferably cold-rolled steel, but alternate materials may be utilized. Further, while the invention is described with regard to a rack assembly 12 including a frame 14, it will be appreciated that the invention is equally applicable to alternate racking assemblies, such as cabinets.

In order to retain the cells 30 on the shelves 16 during seismic activity, the rack assembly 12 additionally includes restraints 40 which are disposed along the front, and preferably rear, of the battery cells 30. The restraints 40 are likewise formed of a material such as cold rolled steel. If the shelves 16 and roof 20 are affixed to the rack supports 18 in a permanent or non-removable manner by a method that is free any external hardware such as by welding, the restraints 40 are the only loose parts of the rack system thereby greatly simplifying assembly and installation of the system.

In the illustrated embodiment, the restraints 40 are coupled to the frame 14 by way of one or more protrusions which engage one or more depressions or holes in the respective components. In the illustrated embodiment, the vertical rack supports 18 comprise a plurality of protrusions 42 which extend from the side surface of the vertical rack supports 18, as may be seen in FIGS. 1–5. The restraint 40, here in the form of an elongated strip 44 with bent flanges 46 at either end, includes openings 48, which are disposed to engage the protrusions 42 extending along the sides of the vertical rack assemblies 18 when the restraint 40 is positioned as shown in FIG. 1. It will be appreciated, however, that the restraints 40 could contain a protrusion, while the frame 14 could contain a depression or opening for receiving the protrusion. Of course, the restraints 40 also can be secured to the frame 14 using any suitable fastening system including external fasteners such as nuts and bolts.

In this case, the openings 48 and protrusions 44 are appropriately sized to provide a secure engagement that will withstand the specified seismic activity. In the illustrated embodiment, the protrusions 42 are triangularly shaped with its base 50 disposed distally from the front mating surface of the frame 14 and the opposite vertex 52 disposed proximally to the front mating surface of the frame 14. The protrusion 42 preferably angles outward from the front vertex 52 to the base 50, the protrusion 42 being open at the base 50, as may be seen in FIG. 4. In this way, as the bent flange 46 of the restraint 40 is advanced from the front edge of the frame 14 toward the rear edge, the bent flange 46 slides up over the angled protrusion 42 until the opening 48 clears the protrusion 42 and the bent flange 46 snaps into position, locking the restraint 40 to the vertical rack support 18.

In one embodiment, the protrusions 42 have a height a on the order of 0.2 to 0.5 inches, a base width b on the order of 0.4 to 0.7 inches, a base 50 to vertex 52 height c on the order of 0.3 to 0.5 inches, and the upper most point of the protrusion 42 d is on the order of 0.75 to 1 inch from the front edge of the vertical rack support 18 (see FIGS. 3 and 4). The corresponding opening 48 has dimensions which are adequate to surround and engage the protrusion, here, dimension e is on the order of 0.5 to 0.8 and the dimension f is on the order of 0.4 to 0.6 (see FIG. 8).

In accordance with an aspect of the invention, the racking system 10 contains all wires and the like within the original footprint of the racking system 10, rather than requiring additional floor space for the placement of wires. More specifically, the vertical rack supports 18 of the frame 14 include a channel 54 for the disposal of wires or the like extending between shelves 16 of the frame 14. The channel 54 extends vertically and provides adequate room for running the wires between the shelves 16 for coupling the cells 30 in parallel or series. In the preferred embodiment, the vertical rack supports 18 are formed of a length of cold-rolled steel which is bent into an S-shape, one portion of the S-shape forming the channel 54, and the other portion of the S-shape presenting surface 56 to which the shelves 16 are secured.

It will be noted that the edge of the vertical rack supports 18 disposed for attachment of the restraints 14 comprises a crenellated shape, the crenels 58 disposed adjacent the protrusions 42. The merlons 60 extending between the crenels 58 not only provide additional strength to the vertical rack support 18, but assist the user in accurate and quick placement of the restraints 40.

While the channels 54 have been described with regard to vertical rack supports 18, it will be appreciated by those of skill in the art that such channels extending along the side edges of the shelves 16 may be utilized in other styles of rack assemblies 12 or cabinets for housing a group of battery cells 30.

In summary, the inventive racking system is cost-effective and easy to assemble and install in the field. The invention also includes a racking system which provides a tidy and self-contained appearance by the provision of internal channels extending between the shelves.

We claim:

1. A battery rack system for stationary power application comprising a rack assembly configured so as to be seismically rated for UBC Zone IV requirements including a plurality of shelves which are supported by a rack frame such that each shelf along with the rack frame defines a respective cell-receiving area that has a front opening, the rack frame defining a footprint, each shelf having at least one associated cell restraint that is removably connected to the rack assembly and that spans across the front opening to the respective cell-receiving area so as to restrain movement of a cell arranged therein, and at least one channel disposed within the rack frame footprint which extends so as to provide a passage between adjacent cell-receiving areas for accommodating wires used to couple cells stored in the rack system, wherein frame has a pair of opposing front edges and a pair of opposing rear edges, each of the front and rear edges having a crenellated shape with a plurality of crenels and merlons, the crenels defining surfaces to which the cell restraints are attached and the merlons being configured to guide placement of the cell restraints.

2. The battery rack system according to claim 1 wherein the rack frame comprises a plurality of upright rack supports and at least one of the supports has an a S-shaped cross-sectional configuration with one half of the S-shape forming the channel and the other half of the S-shape defining a surface to which the shelves are secured.

3. The battery rack system according to claim 1 wherein each cell-receiving space has a rear opening and each shelf has an associated second restraint which is connected to the rack assembly so as to span across the rear opening of the respective cell-receiving space.

4. The battery rack system according to claim 1 wherein each cell restraint is removably connected to the rack frame.

5. The battery rack system according to claim 1 wherein each cell restraint comprises an elongated strip with flanges at either end that define connection surfaces for connecting to the rack assembly.

6. The battery rack system according to claim 1 wherein each cell restraint is connected to the rack frame by interlocking protrusions and depressions.

7. The battery rack system according to claim 1 wherein each shelf has front, rear and opposing side edges, the front edge having a flange which extends away from a front opening to the respective cell-receiving area and the rear edge having a flange which extends in the opposite direction of the front edge flange so as to define a stop surface for positioning a cell on the shelf.

8. The battery rack system according to claim 7 wherein each of the side edges has a respective flange which is secured to the rack frame.

9. The battery rack system according to claim 1 wherein each of the shelves includes channel sections for strengthening the respective shelf.

10. The battery rack system according to claim 1 wherein the shelves are non-removably affixed to the rack frame free of any external hardware.

* * * * *